(12) United States Patent
Liu

(10) Patent No.: US 11,081,756 B2
(45) Date of Patent: Aug. 3, 2021

(54) POWER BANK FOR ELECTRONIC CIGARETTE

(71) Applicant: Tuanfang Liu, Shenzhen (CN)

(72) Inventor: Tuanfang Liu, Shenzhen (CN)

(*) Notice: Subject to any disclaimer, the term of this patent is extended or adjusted under 35 U.S.C. 154(b) by 172 days.

(21) Appl. No.: 16/561,054

(22) Filed: Sep. 5, 2019

(65) Prior Publication Data

US 2020/0321567 A1 Oct. 8, 2020

(30) Foreign Application Priority Data

Apr. 2, 2019 (CN) .......................... 201910262695.3
Apr. 2, 2019 (CN) .......................... 201920441645.7

(51) Int. Cl.
*H01M 50/213* (2021.01)
*H01M 50/183* (2021.01)
*H01M 10/46* (2006.01)
*H01M 10/48* (2006.01)

(52) U.S. Cl.
CPC ......... *H01M 50/213* (2021.01); *H01M 10/46* (2013.01); *H01M 10/488* (2013.01); *H01M 50/183* (2021.01); *H01M 2220/30* (2013.01)

(58) Field of Classification Search
CPC .................................................. H01M 50/213
See application file for complete search history.

(56) References Cited

U.S. PATENT DOCUMENTS 9,867,399 B1* 1/2018 Liu .......................... A24F 40/42
2016/0331030 A1* 11/2016 Ampolini ............... H01M 10/48
2017/0311646 A1* 11/2017 Liu .......................... A24F 40/40

* cited by examiner

*Primary Examiner* — Brian R Ohara
(74) *Attorney, Agent, or Firm* — Matthias Scholl P.C.; Matthias Scholl

(57) ABSTRACT

A power bank includes a face shell; a back shell; a first panel; a second panel; an on-off button; a power adjustment button; a thread ring; a seal ring; a first electrode; a spring; an insulator; a sleeve piece; a second electrode; a silica seal; a battery cell; a control board; a silicone pad; a fixed ring; a display screen; and a light guide film. The face shell and the back shell are combined to form a cylinder including a first end and a second end. The face shell includes a front face and a back face, and the first panel and the second panel are attached to the front face and the back face, respectively. The first panel includes a first groove and a second groove, and the on-off button and the power adjustment button are disposed in the first groove and the second groove, respectively.

2 Claims, 3 Drawing Sheets

POWER BANK FOR ELECTRONIC CIGARETTE

CROSS-REFERENCE TO RELATED APPLICATIONS

Pursuant to 35 U.S.C. § 119 and the Paris Convention Treaty, this application claims foreign priority to Chinese Patent Application No. 201910262695.3 filed Apr. 2, 2019, and to Chinese Patent Application No. 201920441645.7 filed Apr. 2, 2019. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

This disclosure relates to a power bank for an electronic cigarette.

Electronic cigarettes atomize nicotine-containing e-liquid. The electronic cigarettes include embedded rechargeable batteries. The rechargeable batteries can be recharged using power banks.

SUMMARY

Provided is a power bank for an electronic cigarette. The power bank comprises a face shell; a back shell; a first panel; a second panel; an on-off button; a power adjustment button; a thread ring; a seal ring; a first electrode; a spring; an insulator; a sleeve piece; a second electrode; a silica seal; a battery cell; a control board; a silicone pad; a fixed ring; a display screen; and a light guide film.

The face shell and the back shell are combined to form a cylinder comprising a first end and a second end; the face shell comprises a front face and a back face, and the first panel and the second panel are attached to the front face and the back face, respectively; the first panel comprises a first groove and a second groove, and the on-off button and the power adjustment button are disposed in the first groove and the second groove, respectively; the positive and negative terminals of the control board are connected positive and negative terminals of the battery cell; and the control board and the battery cell are disposed in the cylinder formed by the face shell and the back shell; the spring is sheathed on the first electrode; the first electrode is disposed on the insulator; the second electrode is directly connected to the first electrode; the silica seal is sheathed on the second electrode and is disposed in the sleeve piece; the thread ring is disposed on the first end of the cylinder formed by the face shell and the back shell; the seal ring is embedded in the thread ring; the sleeve piece abuts against the thread ring; and the silicone pad is disposed on the second end of the cylinder; the fixed ring is sheathed on the silicone pad; the display screen is disposed on the silicone pad; and the light guide film is attached to the display screen.

The power adjustment button can comprise six tap positions corresponding to different output powders.

Advantages of the power bank according to embodiments of the disclosure are summarized as follows. The power bank is cylindrical and compact, so it is easy to carry.

The power bank comprises a power adjustment button. Continuous pressing the power adjustment button can adjust the output power of the power bank.

DETAILED DESCRIPTION

To further illustrate, embodiments detailing a power bank for an electronic cigarette are described below. It should be noted that the following embodiments are intended to describe and not to limit the disclosure.

Figure 1:
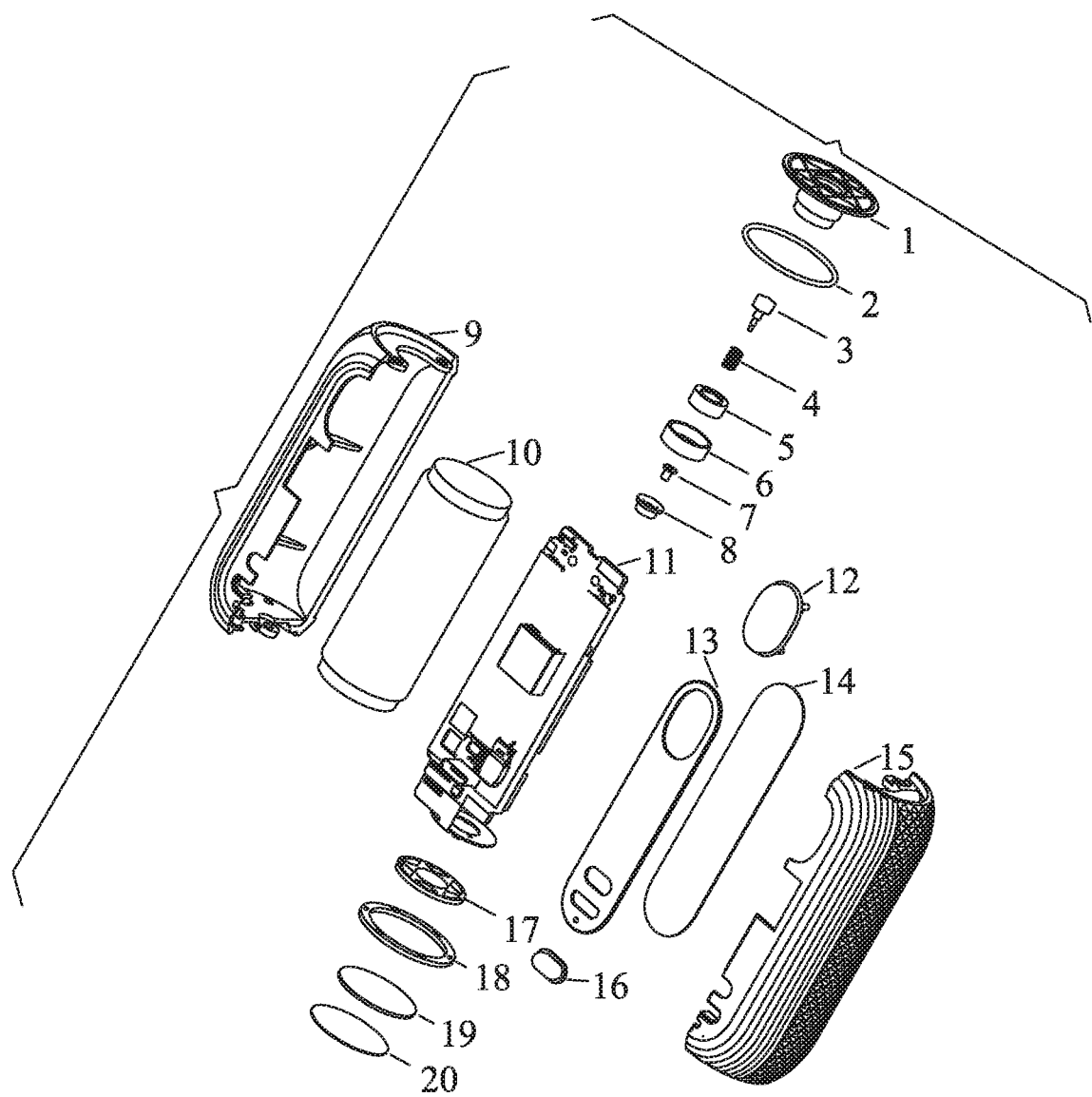
FIG. 1 is an exploded view of a power bank for an electronic cigarette according to one embodiment of the disclosure.
Figure 2:
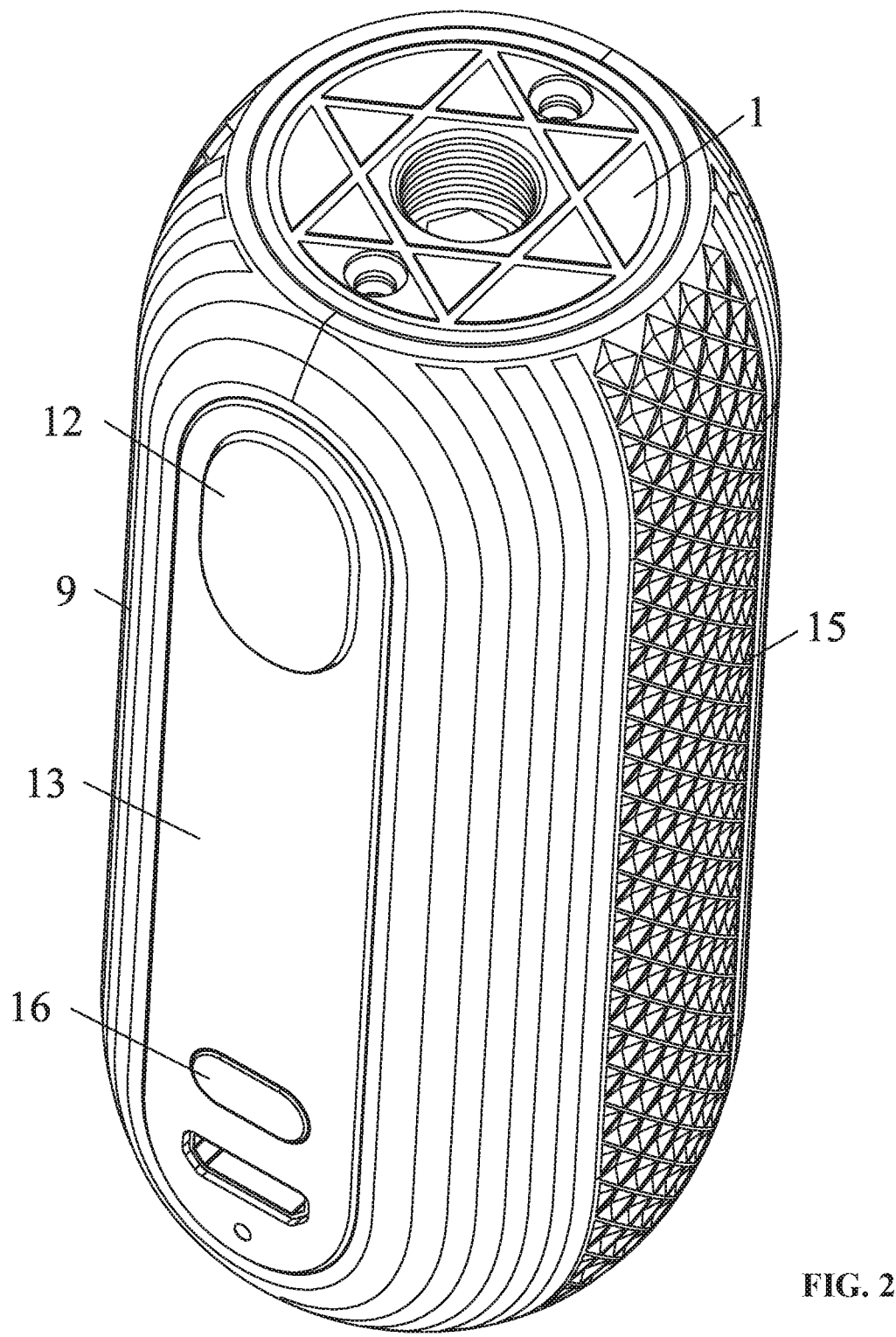
FIG. 2 is a stereogram of a power bank for an electronic cigarette according to one embodiment of the disclosure.
Figure 3:
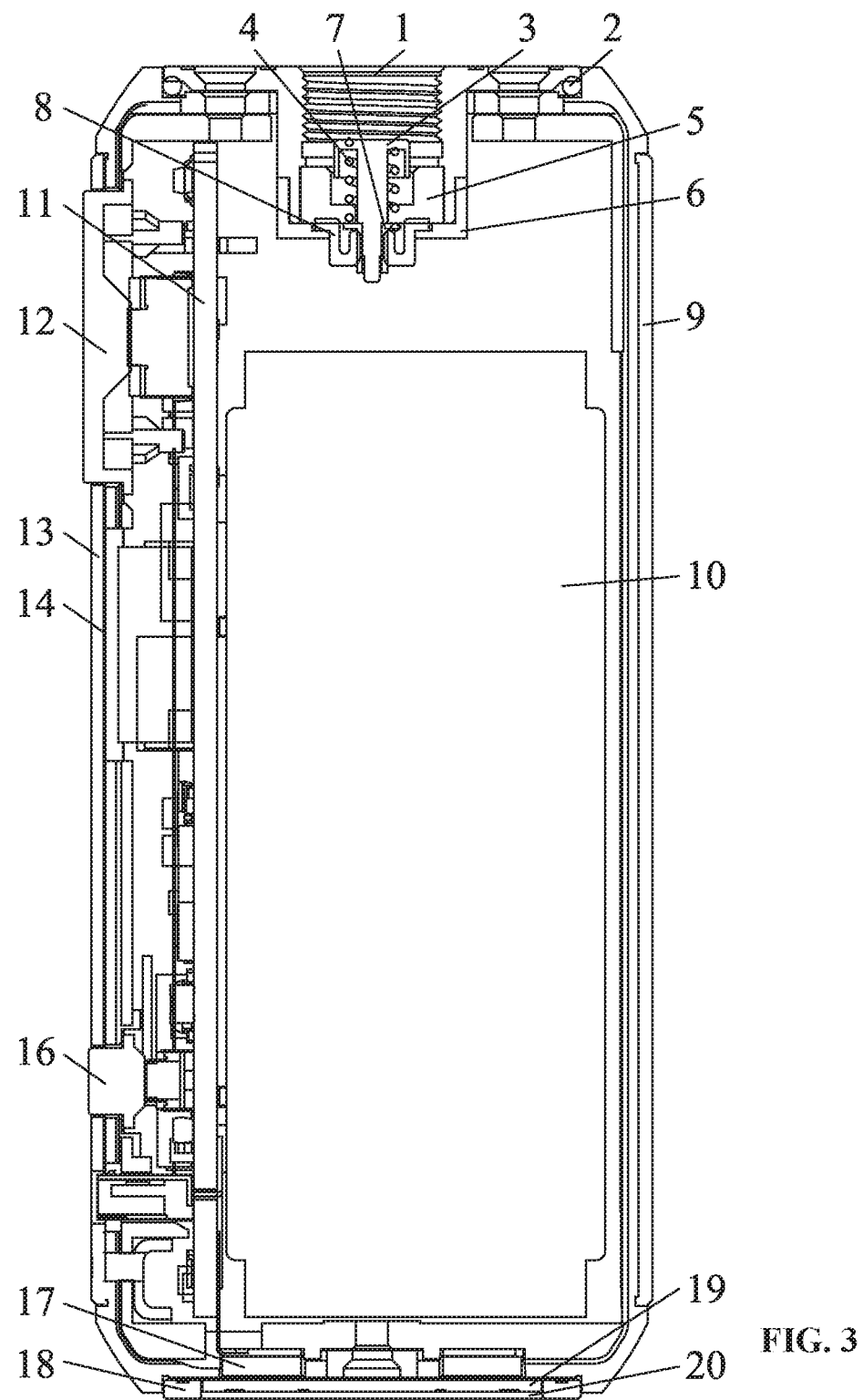
FIG. 3 is a sectional view of a power bank for an electronic cigarette according to one embodiment of the disclosure.

As shown in FIGS. 1-3, provided is a power bank for an electronic cigarette, comprising: a face shell 9; a back shell 15; a first panel 13; a second panel 14; an on-off button 12; a power adjustment button 16; a thread ring 1; a seal ring 2; a first electrode 3; a spring 4; an insulator 5; a sleeve piece 6; a second electrode 7; a silica seal 8; a battery cell 10; a control board 11; a silicone pad 17; a fixed ring 18; a display screen 19; and a light guide film 20.

The face shell 9 and the back shell 15 are combined to form a cylinder comprising a first end and a second end; the face shell 9 comprises a front face and a back face, and the first panel 13 and the second panel 14 are attached to the front face and the back face, respectively; the first panel 13 comprises a first groove and a second groove, and the on-off button 12 and the power adjustment button 16 are disposed in the first groove and the second groove, respectively; the positive and negative terminals of the control board 11 are connected positive and negative terminals of the battery cell 10; and the control board 11 and the battery cell 10 are disposed in the cylinder formed by the face shell 9 and the back shell 15; the spring 4 is sheathed on the first electrode 3; the first electrode 3 is disposed on the insulator 5; the second electrode 7 is directly connected to the first electrode 3; the silica seal 8 is sheathed on the second electrode 7 and is disposed in the sleeve piece 6; the thread ring 1 is disposed on the first end of the cylinder formed by the face shell 9 and the back shell 15; the seal ring 2 is embedded in the thread ring 1; the sleeve piece 6 abuts against the thread ring 1; and the silicone pad 17 is disposed on the second end of the cylinder; the fixed ring 18 is sheathed on the silicone pad 17; the display screen 19 is disposed on the silicone pad 17; and the light guide film 20 is attached to the display screen 19.

The power adjustment button 16 comprises six tap positions, so as to adjust the power bank to output different power to the electronic cigarette.

The power bank is cylindrical and compact, so it is easy to carry. The power adjustment button 16 comprises six tap positions. Continuous pressing the power adjustment button can adjust the output power of the power bank. For example, continuously press the power adjustment button six times, the power bank can output a maximum voltage. The output voltage periodically changes in six values as per the press times of the power adjustment button.

It will be obvious to those skilled in the art that changes and modifications may be made, and therefore, the aim in the appended claims is to sleeve piece all such changes and modifications.

What is claimed is:

1. A device, comprising:
- a face shell;
- a back shell;
- a first panel;
- a second panel;
- an on-off button;
- a power adjustment button;
- a thread ring;
- a seal ring;
- a first electrode;
- a spring;
- an insulator;
- a sleeve piece;
- a second electrode;
- a silica seal;
- a battery cell;
- a control board;
- a silicone pad;
- a fixed ring;
- a display screen; and
- a light guide film;

wherein:
- the face shell and the back shell are combined to form a cylinder comprising a first end and a second end;
- the face shell comprises a front face and a back face, and the first panel and the second panel are attached to the front face and the back face, respectively;
- the first panel comprises a first groove and a second groove, and the on-off button and the power adjustment button are disposed in the first groove and the second groove, respectively;
- positive and negative terminals of the control board are connected positive and negative terminals of the battery cell; and the control board and the battery cell are disposed in the cylinder formed by the face shell and the back shell;
- the spring is sheathed on the first electrode; the first electrode is disposed on the insulator; the second electrode is directly connected to the first electrode;
- the silica seal is sheathed on the second electrode and is disposed in the sleeve piece;
- the thread ring is disposed on the first end of the cylinder formed by the face shell and the back shell; the seal ring is embedded in the thread ring; the sleeve piece abuts against the thread ring; and
- the silicone pad is disposed on the second end of the cylinder; the fixed ring is sheathed on the silicone pad; the display screen is disposed on the silicone pad; and the light guide film is attached to the display screen.

2. The device of claim 1, wherein the power adjustment button comprises six tap positions corresponding to different output powders.

* * * * *